(12) United States Patent
Frazier et al.

(10) Patent No.: US 12,192,076 B2
(45) Date of Patent: Jan. 7, 2025

(54) NETWORK TRAFFIC IDENTIFICATION USING MACHINE LEARNING

(71) Applicant: Zscaler, Inc., San Jose, CA (US)

(72) Inventors: Alexander Frazier, San Jose, CA (US); Dianhuan Lin, Sunnyvale, CA (US); Amir Levy, San Jose, CA (US); Amanda Carter, Dyrham (GB); Piyush Gour, Bangalore (IN)

(73) Assignee: Zscaler, Inc., San Jose, CA (US)

( * ) Notice: Subject to any disclaimer, the term of this patent is extended or adjusted under 35 U.S.C. 154(b) by 65 days.

(21) Appl. No.: 17/567,310

(22) Filed: Jan. 3, 2022

(65) Prior Publication Data
US 2023/0155902 A1    May 18, 2023

(30) Foreign Application Priority Data
Nov. 18, 2021    (IN) .............................. 202111053071

(51) Int. Cl.
| | | |
|---|---|---|
| *G06F 15/173* | (2006.01) | |
| *H04L 41/16* | (2022.01) | |
| *H04L 43/04* | (2022.01) | |
| *H04L 43/062* | (2022.01) | |
| *H04L 47/2483* | (2022.01) | |

(52) U.S. Cl.
CPC .............. *H04L 43/04* (2013.01); *H04L 41/16* (2013.01); *H04L 43/062* (2013.01); *H04L 47/2483* (2013.01)

(58) Field of Classification Search
CPC ...... H04L 43/04; H04L 41/16; H04L 47/2483
See application file for complete search history.

(56) References Cited

U.S. PATENT DOCUMENTS

| | | |
|---|---|---|
| 6,009,475 A | 12/1999 | Shrader |
| 6,138,162 A | 10/2000 | Pistriotto et al. |
| 7,316,029 B1 | 1/2008 | Parker et al. |
| 7,383,569 B1 | 6/2008 | Elgressy et al. |
| 7,620,985 B1 | 11/2009 | Bush et al. |
| 8,166,533 B2 | 4/2012 | Yuan |
| 8,499,348 B1 | 7/2013 | Rubin |
| 8,677,471 B2 | 3/2014 | Karels et al. |
| 9,065,850 B1 | 6/2015 | Sobrier |

(Continued)

FOREIGN PATENT DOCUMENTS

WO    2018152303 A1    8/2018

OTHER PUBLICATIONS

Jordaney, Roberto, et al., "Transcend: Detecting concept drift in malware classification models," 26th {USENIX} Security Symposium ({USENIX} Security 17), 2017.

(Continued)

*Primary Examiner* — Yves Dalencourt
(74) *Attorney, Agent, or Firm* — Baratta Law PLLC; Lawrence A. Baratta, Jr.; Ryan Odessa

(57) ABSTRACT

Systems and methods include obtaining historical data of traffic for a plurality of locations for a cloud service; labeling the historical data as one of human and server based on a plurality of features; and utilizing the labeled historical data to train a machine learning model to classify traffic as one of human and server. The steps can further include utilizing the trained machine learning model to classify unauthenticated traffic, for the cloud service, from a specific location or a specific IP address.

20 Claims, 8 Drawing Sheets

(56) References Cited

U.S. PATENT DOCUMENTS

| | | | |
|---|---|---|---|
| 9,152,789 B2 | 10/2015 | Natarajan et al. | |
| 9,407,652 B1* | 8/2016 | Kesin | H04L 67/535 |
| 9,773,107 B2 | 9/2017 | White et al. | |
| 10,142,362 B2 | 11/2018 | Weith et al. | |
| 10,154,067 B2 | 12/2018 | Smith et al. | |
| 10,348,599 B2 | 7/2019 | O'Neil et al. | |
| 10,362,048 B2 | 7/2019 | Alexander et al. | |
| 10,419,477 B2 | 9/2019 | Desai et al. | |
| 10,439,985 B2 | 10/2019 | O'Neil | |
| 10,498,605 B2 | 12/2019 | Weith et al. | |
| 10,505,899 B1 | 12/2019 | Singh et al. | |
| 10,836,309 B1* | 11/2020 | Trundle | G08G 1/0116 |
| 2005/0193222 A1 | 9/2005 | Greene | |
| 2006/0095970 A1 | 5/2006 | Rajagopal et al. | |
| 2007/0233477 A1 | 10/2007 | Halowani et al. | |
| 2010/0115621 A1 | 5/2010 | Staniford et al. | |
| 2016/0344770 A1 | 11/2016 | Verma et al. | |
| 2017/0063886 A1 | 3/2017 | Muddu et al. | |
| 2017/0078329 A1 | 3/2017 | Hwang et al. | |
| 2017/0272465 A1 | 9/2017 | Steele | |
| 2017/0329966 A1* | 11/2017 | Koganti | G06F 21/56 |
| 2017/0374091 A1* | 12/2017 | Igbe | H04L 63/1441 |
| 2018/0041471 A1 | 2/2018 | Sudo et al. | |
| 2018/0150758 A1 | 5/2018 | Niininen et al. | |
| 2018/0293381 A1 | 10/2018 | Tseng et al. | |
| 2019/0281073 A1 | 9/2019 | Weith et al. | |
| 2019/0319972 A1 | 10/2019 | Desai | |
| 2019/0349283 A1 | 11/2019 | O'Neil et al. | |
| 2020/0021618 A1 | 1/2020 | Smith et al. | |
| 2020/0382535 A1* | 12/2020 | Herley | H04L 67/02 |
| 2022/0129318 A1* | 4/2022 | Qiu | G06F 9/5011 |

OTHER PUBLICATIONS

Kantchelian, Alex, J. D. Tygar, and Anthony Joseph, "Evasion and hardening of tree ensemble classifiers," International Conference on Machine Learning, 2016.

Tolomei, Gabriele, et al., "Interpretable predictions of tree-based ensembles via actionable feature tweaking," Proceedings of the 23rd ACM SIGKDD International Conference on Knowledge Discovery and Data Mining. ACM, 2017.

Aug. 13, 2019, International Preliminary Report on Patentability and Written Opinion for International Application No. PCT/US2018/015902.

Aug. 20, 2019, International Preliminary Report on Patentability and Written Opinion for International Application No. PCT/US2018/018325.

* cited by examiner

NETWORK TRAFFIC IDENTIFICATION USING MACHINE LEARNING

FIELD OF THE DISCLOSURE

The present disclosure generally relates to computer networking systems and methods. More particularly, the present disclosure relates to systems and methods for network traffic identification using machine learning.

BACKGROUND OF THE DISCLOSURE

Cloud-based service providers are becoming a more and more useful tool for enterprises. These providers offer a wide variety of cloud-based platforms from infrastructure to applications and security services. A customer of a cloud-based service provider will typically pay for only the amount of cloud services they use, as business demands require. Because of this, it is important for providers to determine the origin of traffic, such as if the traffic is human or server. Currently for unauthenticated traffic, the origin of this traffic is typically manually determined by teams within the cloud-based service providers to distinguish, for example, if traffic is user/guest (human traffic) or server traffic. This worked well when there were not nearly as many customers as there are today. Network traffic identification is crucial for both the service provider as well as the customer. A well understood landscape of the traffic through a cloud-based service can allow a provider to offer personalized services such as security as well as fairly bill customers for service access.

BRIEF SUMMARY OF THE DISCLOSURE

The present disclosure relates to systems and methods for network traffic identification using machine learning. The present disclosure relates to identifying authenticated and unauthenticated traffic through a cloud service. The present disclosure utilizes machine learning (ML) to identify different users and servers to better recognize the traffic in a cloud-based service. Currently, IT personnel are required to manually break down the traffic and are unable to account for a large portion of the unauthenticated traffic. This can cause a large amount of unauthenticated traffic to utilize the services in the cloud-based service and go unrecognized for business purposes such as billing and customer assessment. The present disclosure utilizes ML to recognize a plurality of features that can distinguish human users to servers. These features including behavioral characteristics such as activity when using the cloud-based services, active times, and other characteristics of the like. The ML model can be trained using historical data collected from for a plurality of locations for a cloud service and labeling such historical data as human or server activity.

In an embodiment, a non-transitory computer-readable storage medium having computer-readable code stored thereon for programming one or more processors to perform steps of: obtaining historical data of traffic for a plurality of locations for a cloud service; labeling the historical data as one of human and server based on a plurality of features; and utilizing the labeled historical data to train a machine learning model to classify traffic as one of human and server. The steps may further include utilizing the trained machine learning model to classify unauthenticated traffic, for the cloud service, from a specific location. The trained machine learning model classifies the traffic as a split between human and server for an entire location. The plurality of features include social networking traffic being labeled as human. The plurality of features include daily activity with activity around a day being labeled as server and activity within business hours being labeled as human. The plurality of features include number of days active with activity every day being labeled as server and activity only during business days being labeled as human. The plurality of features include number of unique hostnames visited by the traffic where less unique hostnames are labeled as server and more unique hostnames are labeled as human. The plurality of features include distinct applications in the traffic where less distinct applications are labeled as server and more distinct applications are labeled as human. The machine learning model may utilize Gradient-boosted decision trees. The steps may include utilizing the trained machine learning model to classify unauthenticated traffic, for the cloud service, from a specific IP address.

In another embodiment, a method includes the steps of: obtaining historical data of traffic for a plurality of locations for a cloud service; labeling the historical data as one of human and server based on a plurality of features; and utilizing the labeled historical data to train a machine learning model to classify traffic as one of human and server. The method may further include utilizing the trained machine learning model to classify unauthenticated traffic, for the cloud service, from a specific location. The trained machine learning model classifies the traffic as a split between human and server for an entire location. The plurality of features include social networking traffic being labeled as human. The plurality of features include daily activity with activity around a day being labeled as server and activity within business hours being labeled as human. The plurality of features include number of days active with activity every day being labeled as server and activity only during business days being labeled as human. The plurality of features include number of unique hostnames visited by the traffic where less unique hostnames are labeled as server and more unique hostnames are labeled as human. The plurality of features include distinct applications in the traffic where less distinct applications are labeled as server and more distinct applications are labeled as human. The machine learning model may utilize Gradient-boosted decision trees. The method may include utilizing the trained machine learning model to classify unauthenticated traffic, for the cloud service, from a specific IP address.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a user device, which may be used with the cloud-based system or the like.

DETAILED DESCRIPTION OF THE DISCLOSURE

Again, the present disclosure relates to systems and methods for network traffic identification using machine learning. The present disclosure relates to identifying authenticated and unauthenticated traffic through a cloud service. The present disclosure utilizes machine learning (ML) to identify different users and servers to better recognize the traffic in a cloud-based service. Currently, IT personnel are required to manually break down the traffic and are unable to account for a large portion of the unauthenticated traffic. This can cause a large amount of unauthenticated traffic to utilize the services in the cloud-based service and go unrecognized for business purposes such as billing and customer assessment. The present disclosure utilizes ML to recognize a plurality of features that can distinguish human users to servers. These features including behavioral characteristics such as activity when using the cloud-based services, active times, and other characteristics of the like. The ML model can be trained using historical data collected from for a plurality of locations for a cloud service and labeling such historical data as human or server activity.

Example Cloud-Based System Architecture

Figure 1:
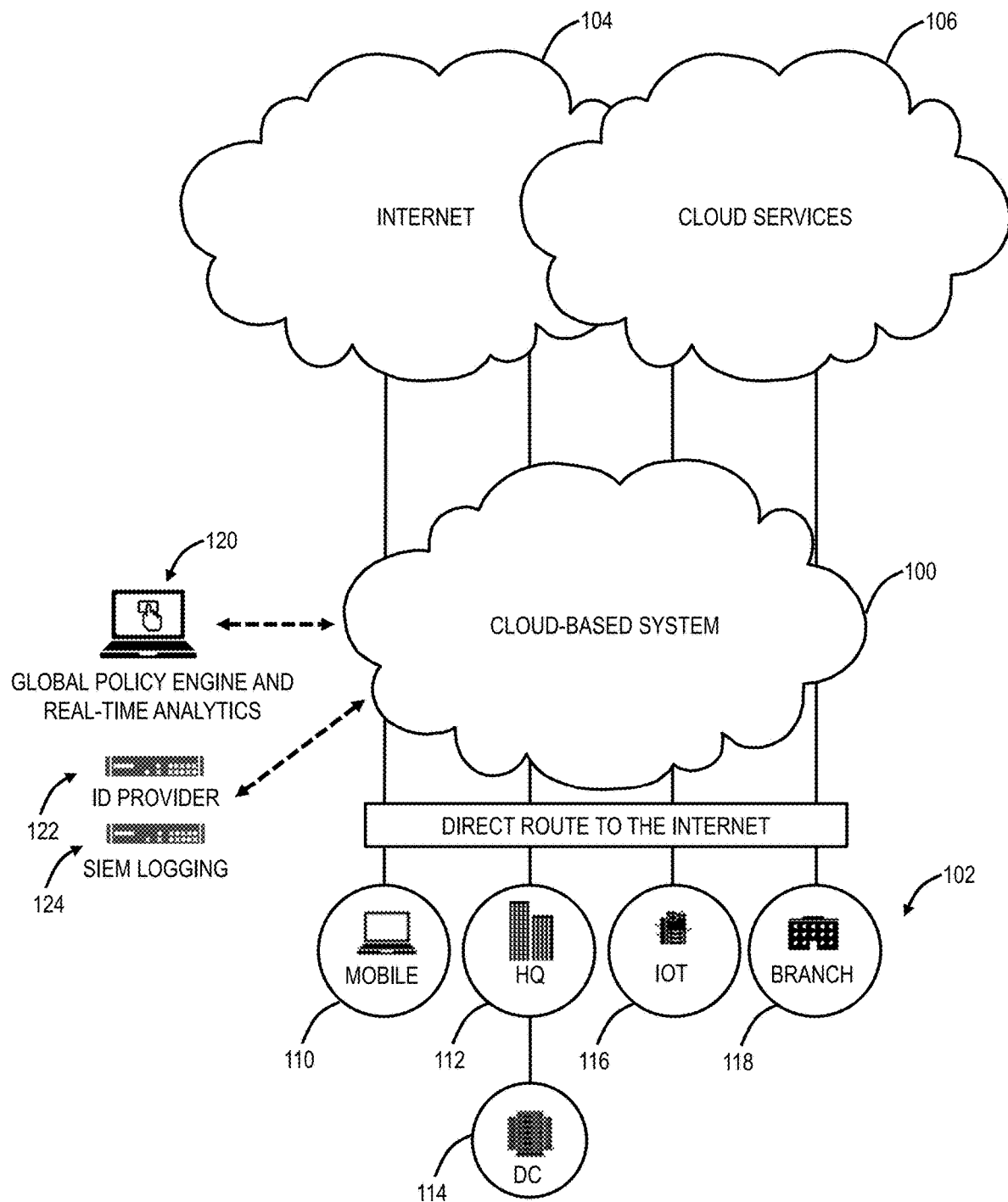
FIG. 1 is a network diagram of a cloud-based system 100 offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
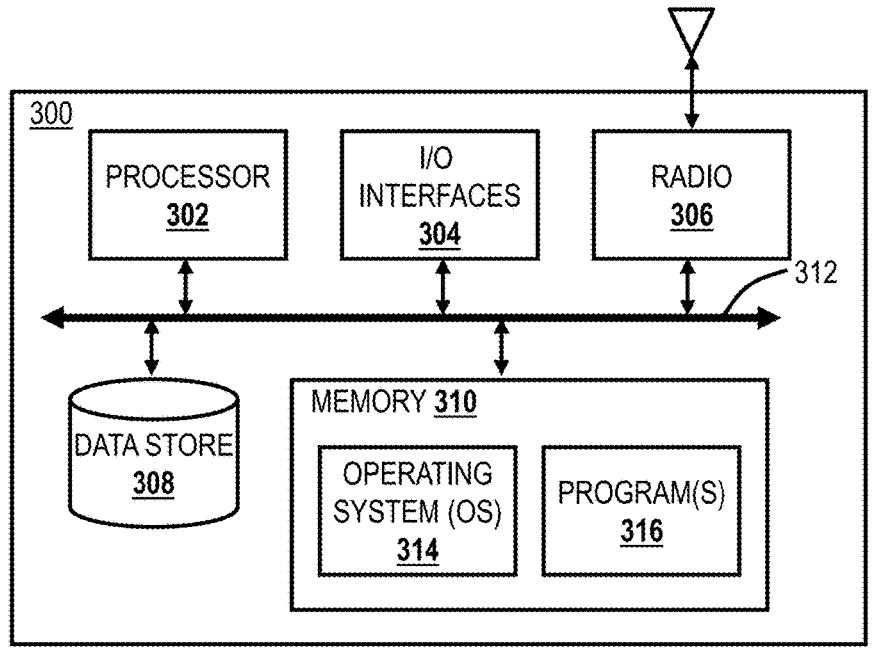

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
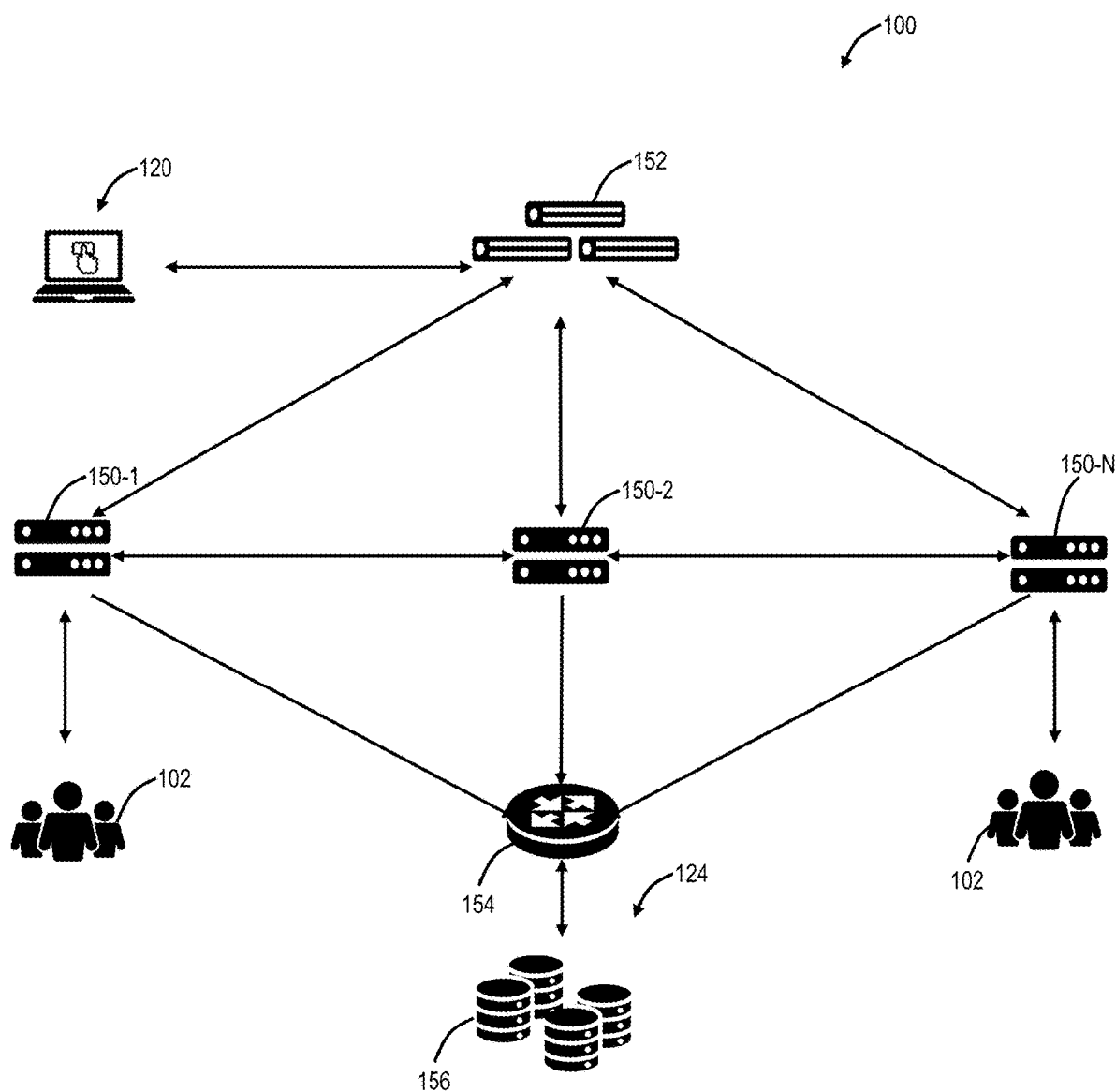
FIG. 2 is a network diagram of an example implementation of the cloud-based system.
Figure 4:
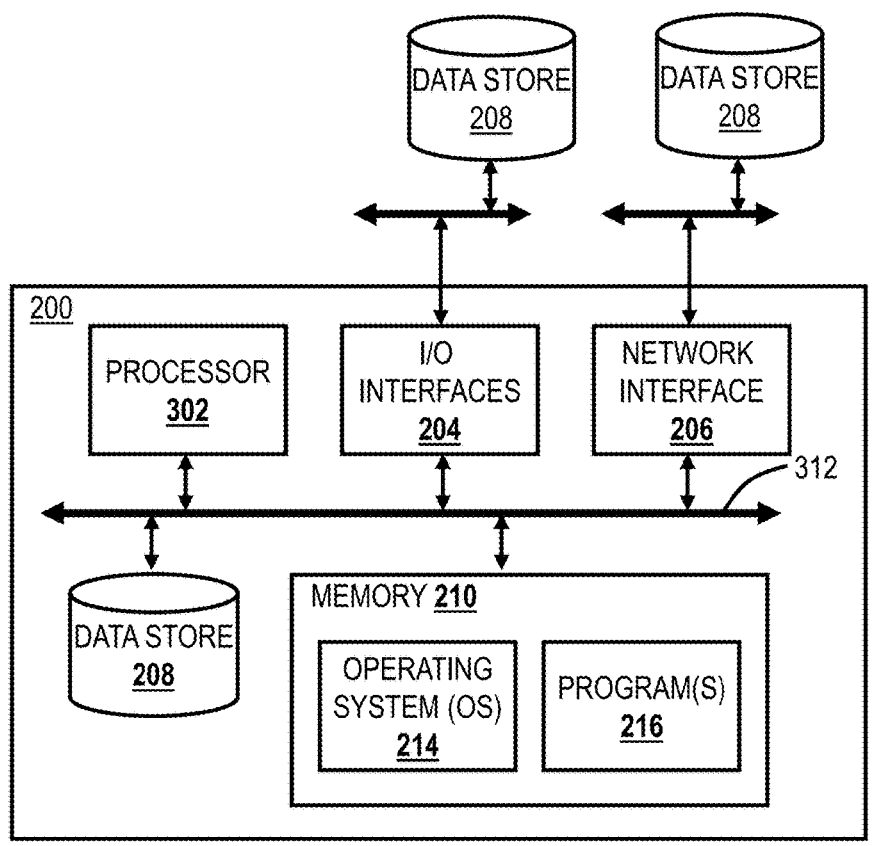
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
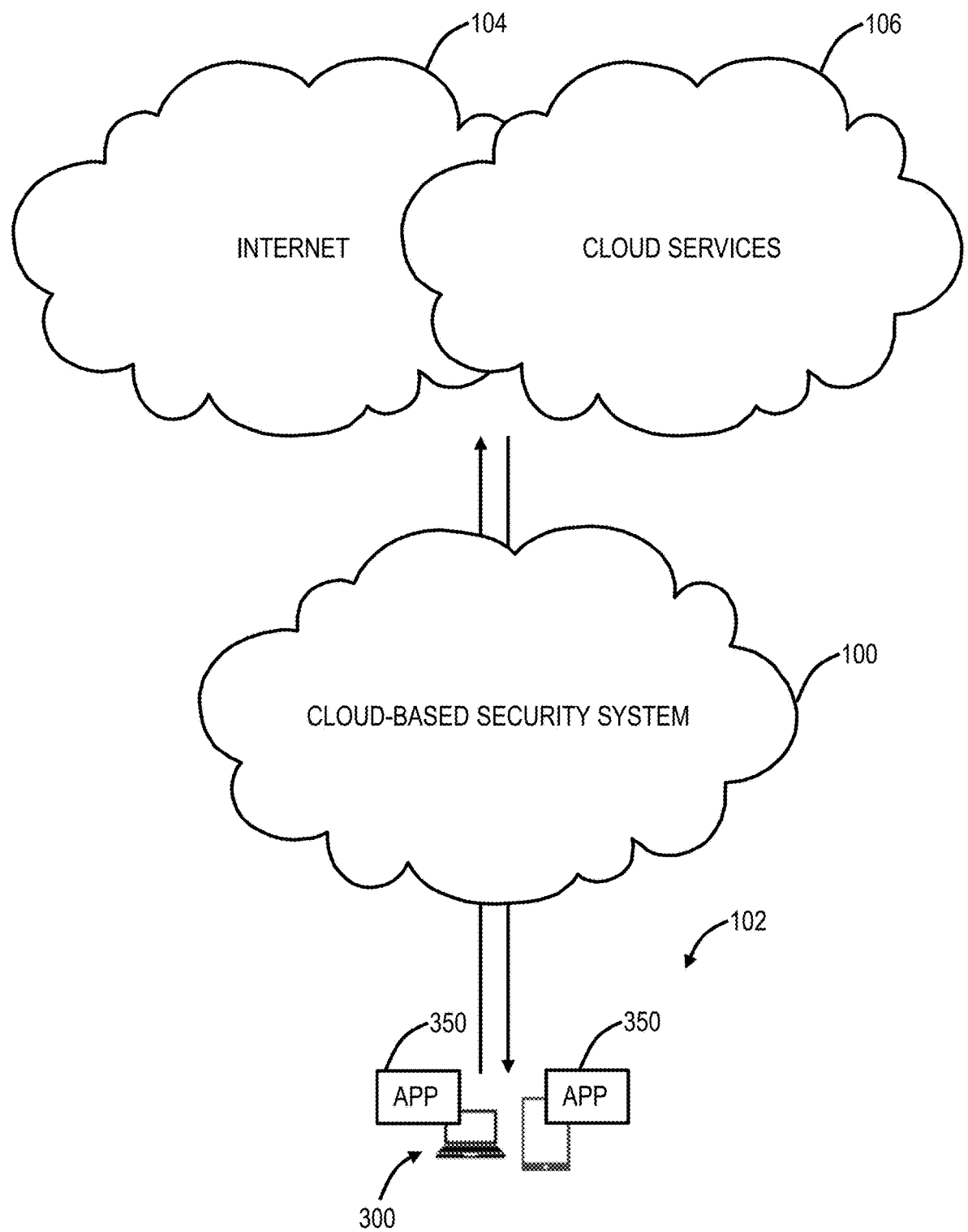
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Network Traffic Identification

Figure 6:
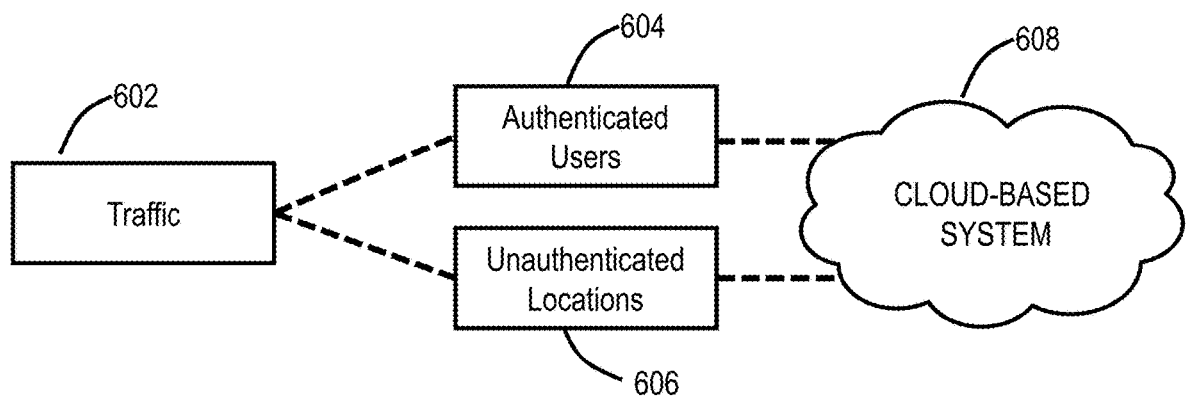
FIG. 6 is a network diagram of the cloud-based system illustrating the breakdown of authenticated and unauthenticated traffic.

FIG. 6 is a network diagram of traffic 602 accessing a cloud-based system 608. The traffic 602 is shown branching off into a plurality of subcategories including authenticated users 604, unauthenticated locations 606, and/or other categories of the like. Authenticated users 604 are generally mostly user traffic and may require some manual breakout to determine the authenticated user origin. Unauthenticated locations 606 may include server or internet of things (IoT) traffic, user traffic, guest traffic, and/or other traffic of the like. In some situations it is beneficial to know the breakdown of different traffic such as authenticated vs unauthenticated. In other embodiments it is crucial to determine the different traffic that makes up the unauthenticated locations 606.

Unauthenticated traffic can be characterized by a large tunnel of traffic originating from a location. This can be due to customers of a cloud-based service tunneling all traffic through the same tunnel and not identifying each user/server. These unauthenticated locations can make up a large portion of a cloud based service providers traffic, thus making it difficult for the providers to determine the origin of the traffic.

Network traffic identification is important for cloud service providers to allow them to correctly determine use load of customers. Some examples may include the ability to accurately determine server traffic vs human traffic (i.e. user traffic). An accurate breakdown of this information can allow cloud service providers to better offer personalized security options, more accurately bill customers for cloud service use, and offer other insights of the like.

Network Traffic Identification Using Machine Learning

The use of machine learning (ML) models can allow the system to determine if traffic in a cloud-based service is human or server traffic. In some embodiments, specific features are used to determine the origin of traffic in the cloud-based service. Transaction level exploration can allow the model to explore a variety of different features without the need to extract new data, thus allowing for faster model experimentation and development. ML models may include the k-nearest neighbors algorithm (KNN), Logistic Regression, Naive Bayes, Decision Trees (both individual and gradient boosted), and other ML models of the like.

Figure 7:
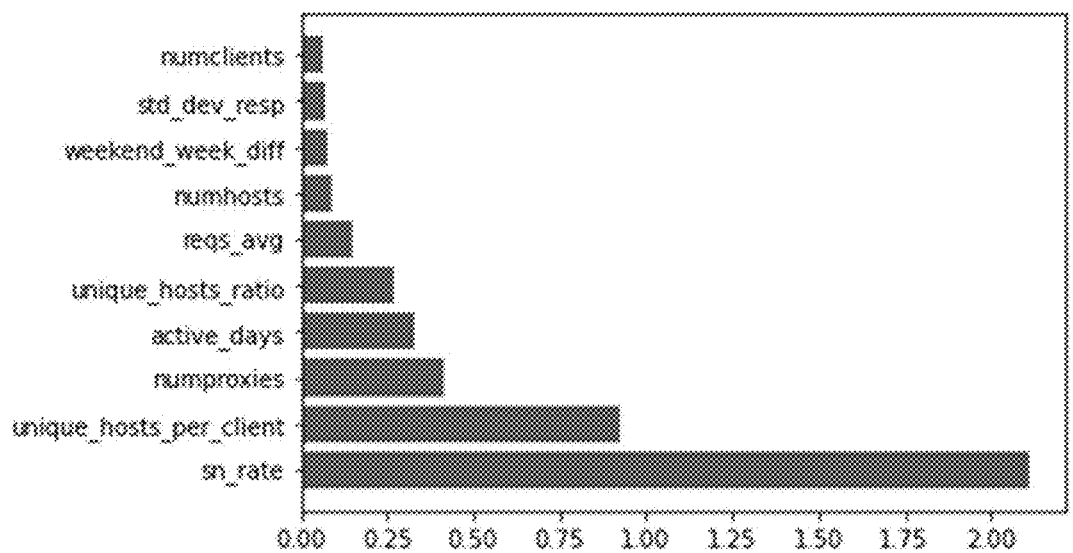
FIG. 7 is a graph illustrating the effectiveness of using different features in the machine learning model.

Different features can be examined when traffic utilizes a cloud-based service, these features including behavioral characteristics, service use metrics, and other features of the like. FIG. 7 is a graph representing the effectiveness of examining different features in determining the traffic source, in this embodiment, either human or server. The features used in the present embodiment are as follows and may include a variety of additional features not limited to the listed features herein.

numclients represents the number of unique clients that a traffic source may visit.

std_dev_resp represents the total response standard deviation.

weekend_week_diff represents the activity difference a traffic source may show on the weekends versus the weekdays, the weekdays typically being more active for human traffic due to work schedules and behaviors.

numhosts represents the number of unique hosts.

reqs_avg represents the average request size of a traffic source.

unique_hosts_ratio represents the ratio of unique hosts accessed by a traffic source.

active_days represents the number of days a traffic source may be active in the cloud-based service. Server traffic typically being represented by nonstop activity and human traffic typically following a work schedule.

numproxies represents the number of proxies.

Unique_hosts_per_client represents the number of different hosts connected to by the client or traffic source.

sn_rate represents the rate at which a traffic source will access a social networking site. This proves to be one of the most important and distinguishing features due to the fact that servers do not typically access social networking sites and humans do.

From the graph in FIG. 7 it can be seen that social networking transaction and unique hosts per client tend to be the most important model features. These features are intuitive because servers visit fewer social media sites and less hosts in general when compared to human traffic. Other important features include num proxies, active days per week, avg req, week vs weekend activity, and other features of the like. These features are used by the ML model to determine the origination of the traffic, i.e., if the traffic is coming from a human or a server. This allows cloud-based service providers the ability to better serve customers by allowing the possibility of personalized security based on the origin of traffic. For example, offering server specific security to customers based on the information gained from the network traffic identification using ML.

In an embodiment, this ML model can be used to determine if an unauthenticated location is mostly made up of server traffic or human traffic. In other embodiments, this ML model can be used to track individual IP addresses to determine the origination of traffic within the location, giving an accurate breakdown of the traffic within the location by utilizing the ML model.

Model Process

Figure 8:
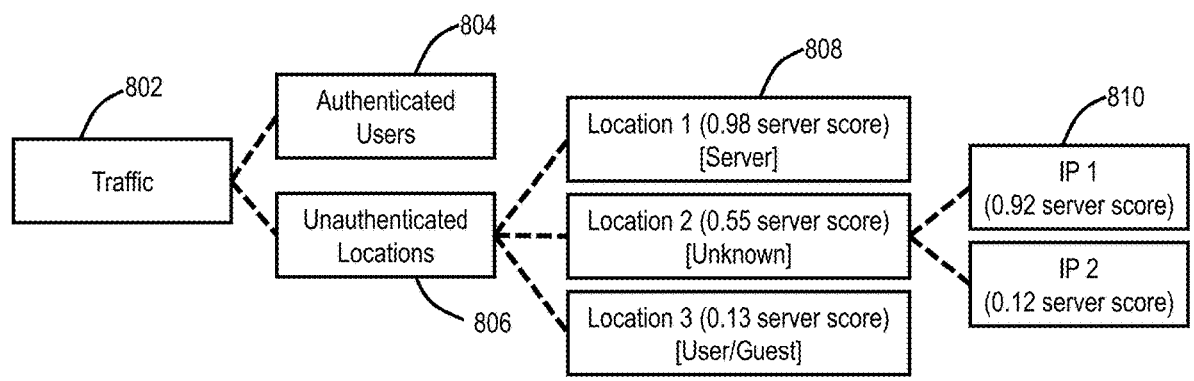
FIG. 8 is a flow diagram illustrating the process of network traffic identification using machine learning.

FIG. 8 is a flow diagram of the model process. The traffic 802 can again be separated into a group for authenticated users 804 and a group for unauthenticated locations 806. The unauthenticated locations 806 may be a location which joins all of its traffic through one tunnel, making it difficult to categorize the origins of the different traffic sources. As stated, an embodiment of the network traffic identification using machine learning can categorize these locations based on the overall determination of the location consisting of mostly human or server traffic as shown in the flow diagram. The locations 808 are given server scores based on the results from the ML model and thus give an insight to the overall traffic of the location 808. From the flow diagram, it can be seen that a higher server score will result in the location being categorized as a server location and a low server score may mean that the location consists of mostly user/guest traffic (human traffic).

In the presence of an indeterminate server score, or if there is a need for a more granular view, the ML model may be used to further look at individual IP addresses 810 to determine the breakdown of server and human traffic in a location. These findings can be combined to allow a cloud-based service provider to better understand the traffic coming from such unauthenticated locations to better serve customers and increase efficiency.

Figure 9:
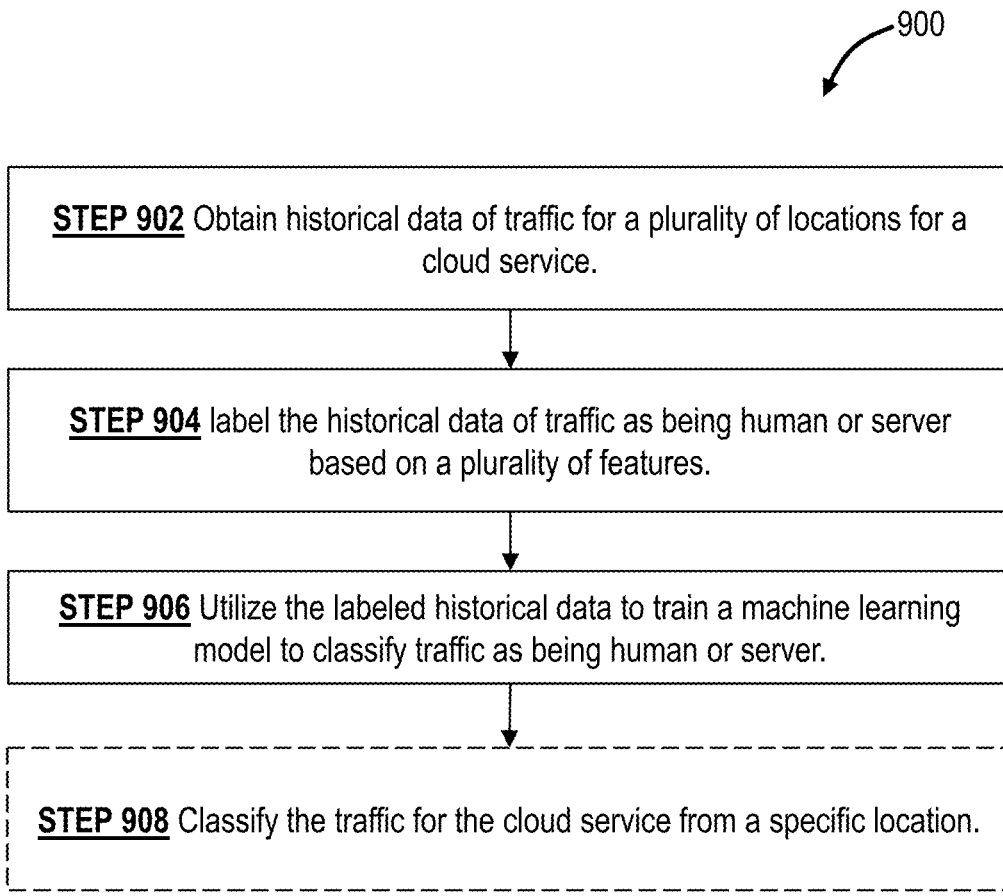
FIG. 9 is a flow diagram illustrating the steps involved in training and using the machine learning model to identify network traffic.

FIG. 9 is a flow diagram of the process 900 which may be used to train and run the ML model. First, historical data of traffic must be obtained for a plurality of locations for the cloud service. The historical data is labeled as being human or server based on the plurality of features disclosed herein and other features of the like. This historical data is then used to train the ML model to further classify traffic as being human or server. This classification can, as stated before, be used to classify traffic for the cloud service from a specific location to obtain a more granular view of the traffic. Again, the plurality of features may include social networking traffic as being a sign of the traffic being human. The plurality of features may include an analysis into the daily activity of traffic, such as daily activity throughout the day being labeled as server and daily activity within business hours being labeled as human. This activity may also provide features including the number of days active with activity every day being labeled as server and activity only during business days being labeled as human. As stated previously, the plurality of features may include the number of hostnames visited by the traffic where the less unique hostnames are labeled as server and the more unique hostnames being labeled as human. Such features may also include distinct applications in the traffic where less distinct applications are labeled as server and more distinct applications are labeled as human.

It will be appreciated that the ML model of the present disclosure may be trained using historical data of any duration and may be retrained if required. Such as if model effectiveness decreases, it may be necessary to retrain the model.

Machine Learning Model

The model can speed up the identification process for determining a breakout of customer traffic in a cloud service. Below are the three stages during the identification process.
1) Obtain historical data of traffic for a plurality of locations for a cloud service.
2) Label the historical data as being human or server based on a plurality of features.
3) Utilize the labeled historical data to train a machine learning model to classify traffic as being human or server.

The model can then be used to classify unauthenticated traffic for the cloud service from a specific location, classifying the traffic as a split between human and server for the entire location.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A non-transitory computer-readable storage medium having computer-readable code stored thereon for programming one or more processors to perform steps of:
    obtaining historical data of traffic for a plurality of locations for a cloud service;
    labeling the historical data as one of human and server based on a plurality of features;
    utilizing the labeled historical data to train a machine learning model to classify traffic as one of human and server;
    monitoring traffic and labeling the monitored traffic as originating from any of authenticated users and unauthenticated locations, wherein the traffic is labeled as originating from an unauthenticated location based on the traffic being tunneled via a tunnel originating from a location, the tunnel including all traffic from the location and not identifying each user or server within the location; and
    utilizing the trained machine learning model to classify traffic originating from the unauthenticated locations, wherein the traffic originating from the unauthenticated locations is given a server score.

2. The non-transitory computer-readable storage medium of claim 1, wherein the steps include
    utilizing the trained machine learning model to assign a server score to a specific location of the plurality of locations; and
    responsive to the specific location being assigned an intermediate server score from the trained machine learning model, utilizing the machine learning model to perform a more granular analysis comprising analyzing individual Internet Protocol (IP) addresses associated with the specific location.

3. The non-transitory computer-readable storage medium of claim 2, wherein the trained machine learning model classifies the traffic labeled as originating from unauthenticated locations as a split between human and server for an entire location.

4. The non-transitory computer-readable storage medium of claim 1, wherein the plurality of features include social networking traffic being labeled as human.

5. The non-transitory computer-readable storage medium of claim 1, wherein the plurality of features include daily activity with activity around a day being labeled as server and activity within business hours being labeled as human.

6. The non-transitory computer-readable storage medium of claim 1, wherein the plurality of features include number of days active with activity every day being labeled as server and activity only during business days being labeled as human.

7. The non-transitory computer-readable storage medium of claim 1, wherein the plurality of features include number of unique hostnames visited by the traffic where less unique hostnames are labeled as server and more unique hostnames are labeled as human.

8. The non-transitory computer-readable storage medium of claim 1, wherein the plurality of features include distinct applications visited by the traffic where traffic visiting less distinct applications are labeled as server and traffic visiting more distinct applications are labeled as human.

9. The non-transitory computer-readable storage medium of claim 1, wherein the machine learning model utilizes Gradient-boosted decision trees.

10. The non-transitory computer-readable storage medium of claim 1, wherein the steps include
    utilizing the trained machine learning model to assign a server score to one or more specific IP addresses associated with a location of the plurality of locations.

11. A method comprising the steps of:
    obtaining historical data of traffic for a plurality of locations for a cloud service;
    labeling the historical data as one of human and server based on a plurality of features;
    utilizing the labeled historical data to train a machine learning model to classify traffic as one of human and server;
    monitoring traffic and labeling the monitored traffic as originating from any of authenticated users and unauthenticated locations, wherein the traffic is labeled as originating from an unauthenticated location based on the traffic being tunneled via a tunnel originating from a location, the tunnel including all traffic from the location and not identifying each user or server within the location; and
    utilizing the trained machine learning model to classify traffic originating from the unauthenticated locations, wherein the traffic originating from the unauthenticated locations is given a server score.

12. The method of claim 11, wherein the steps include
    utilizing the trained machine learning model to assign a server score to a specific location of the plurality of locations; and
    responsive to the specific location being assigned an intermediate server score from the trained machine learning model, utilizing the machine learning model to perform a more granular analysis comprising analyzing individual Internet Protocol (IP) addresses associated with the specific location.

13. The method of claim 12, wherein the trained machine learning model classifies the traffic labeled as originating from unauthenticated locations as a split between human and server for an entire location.

14. The method of claim 11, wherein the plurality of features include social networking traffic being labeled as human.

15. The method of claim 11, wherein the plurality of features include daily activity with activity around a day being labeled as server and activity within business hours being labeled as human.

16. The method of claim 11, wherein the plurality of features include number of days active with activity every day being labeled as server and activity only during business days being labeled as human.

17. The method of claim 11, wherein the plurality of features include number of unique hostnames visited by the traffic where less unique hostnames are labeled as server and more unique hostnames are labeled as human.

18. The method of claim 11, wherein the plurality of features include distinct applications visited by the traffic where traffic visiting less distinct applications are labeled as server and traffic visiting more distinct applications are labeled as human.

19. The method of claim 11, wherein the machine learning model utilizes Gradient-boosted decision trees.

20. The method of claim 11, wherein the steps include
    utilizing the trained machine learning model to assign a server score to one or more specific IP addresses associated with a location of the plurality of locations.

* * * * *